UNITED STATES PATENT OFFICE.

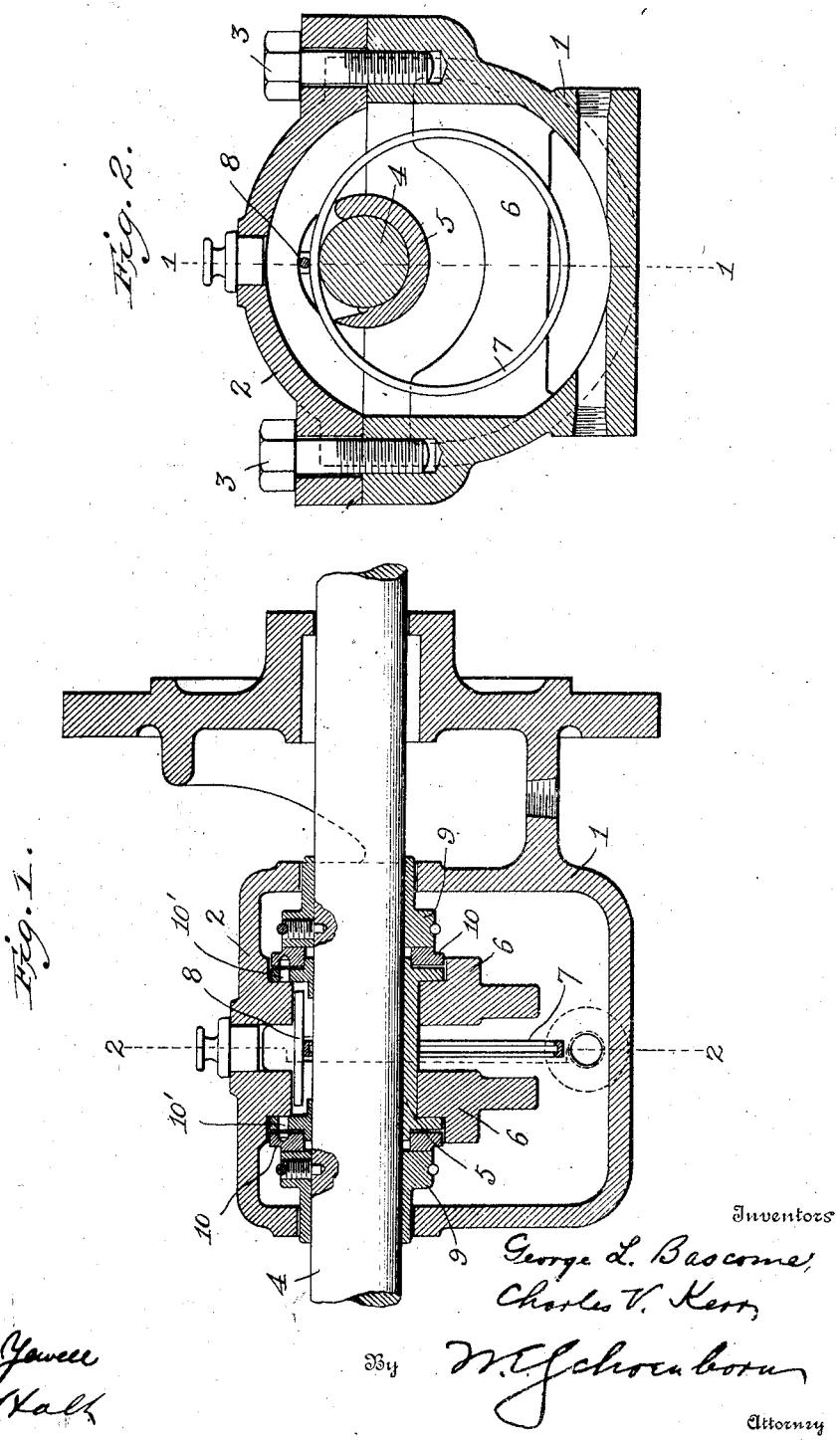

GEORGE L. BASCOME AND CHARLES V. KERR, OF WELLSVILLE, NEW YORK, ASSIGNORS TO KERR TURBINE COMPANY, OF WELLSVILLE, NEW YORK, A CORPORATION OF NEW YORK.

LUBRICATING-BEARING FOR STEAM-TURBINES OR THE LIKE.

No. 905,631.  Specification of Letters Patent.  Patented Dec. 1, 1908.

Application filed March 25, 1907. Serial No. 364,379.

*To all whom it may concern:*

Be it known that we, GEORGE L. BASCOME and CHARLES V. KERR, citizens of the United States, residing at Wellsville, in the county of Allegany and State of New York, have invented certain new and useful Improvements in Lubricating-Bearings for Steam-Turbines or the Like, of which the following is a specification.

The invention relates to lubricating bearings and particularly to that type of lubricating device wherein oil is fed to the bearing of a rotary shaft by means of a ring loosely mounted thereon.

The object of the invention is to provide an improvement of this character especially adapted for use with high speed shafts, as for example those of steam turbines.

A further object is to provide a device which while simple and easily produced will be highly efficient in operation and very durable.

The invention consists first in a novel form of loose ring, second in an improved means for transferring the oil therefrom to the shaft, and third in details of relative arrangement and construction.

The tendency of the oil carried up by a loose lubricating ring especially if running at high speed is to creep around on the back of the ring and either be thrown off by centrifugal force or else be carried on over the shaft and thus have no part in the lubrication of the bearing. If the inner surface of such a ring is flat it presents so much area of contact on the shaft that if the shaft has a high surface speed the ring refuses to follow. Again if the outer surface of the ring be rounded, the tendency is to increase the trouble due to the oil creeping up on the back of the ring and flying off by centrifugal force.

We therefore make the ring according to our invention of hollow section with edges which are quite narrow bearing on the shaft. The weight of the ring on these thin edges pushes the edges through the oil and into contact with the shaft and makes it follow with much higher speed than would otherwise be the case. Then the hollow inner surface of the ring fills with oil which is prevented from flowing out sidewise from the action of the centrifugal force by the thin bearing edges of the ring.

We make the back of the ring flat, first to lessen the action of centrifugal force on the oil and, second, to permit us to lay across the ring a pin or roller which lies parallel with the shaft. As the ring rolls on the shaft this pin or roller in turn rolls on the back of the ring and pushes off the oil which is brought up on the back of the ring and puts it in position to be distributed through the oil channels provided in the bearing shell or brass. The roller in practice bears against the far side of the groove in which it is confined loosely and presses the oil into the channel parallel to the shaft, which is provided for said pin or roller. The roller has room for a slight endwise motion, and is not confined in any direction except as it rests by its own weight on the back of the oil ring. The construction of the brass and bearing cover is such that while the roller is perfectly free yet it cannot get out of place.

Our invention will be more readily understood by reference to the accompanying drawings in which like reference characters are used to designate the same parts in both figures and wherein, Figure 1 is a central longitudinal section on line 1—1 of Fig. 2 of the exhaust end bearing of a steam turbine with our improved lubricating device applied thereto. Fig. 2 is a transverse section on line 2—2 of Fig. 1.

1 designates the bearing case, the lower part thereof being formed to constitute an oil reservoir or well; a cover 2 is fitted to said case by bolts 3, and the shaft 4 passes through suitable apertures in the upper part of the case. The shaft 4 is adapted to have bearing and rotate in the bearing shell 5, which shell is mounted and supported in bridges 6, 6, said bridges projecting from the case and spaced apart to permit the oiling ring to operate between them; as will be seen the shell is partially cut away at its upper side.

7 is the oiling ring, the same being of a size to rest on top of the shaft and have its lower part extend to the lower part of the oil reservoir. Such ring as shown is provided with an inner annular recess or groove whereby the surface left as bearings upon the shaft consists of relatively thin edges or flanges.

8 designates a pin or roller the same being loosely mounted in a suitable recess above the ring and transversely of the same directly over the shaft. Said pin is free to adjust itself vertically by gravity and will hence press lightly against the ring.

In the present instance means are shown to maintain a fixed longitudinal position of the shaft in order to locate the turbine disks properly with relation to the nozzle. Such means consist of thrust collars 9—9 suitably fixed to the shaft and adapted to bear against wear rings 10—10 held against rotation with respect to the bearing by pins in openings 10'.

The roller 8 may be made of brass or steel or other suitable metal and this element may be variously modified and still come within the scope of our invention. For example, a groove might be turned in the pin where it bears on the ring for the purpose of more efficiently pushing off the oil and to guide or direct the motion of the ring or the ends of the pin may be turned down to a conical point so as to bear lightly and without appreciable friction on the ends of the slot. The oiling ring will be held within the limits of its proper play by the bridges 6, 6, and as before explained its design is such as to cause it to convey a maximum amount of lubricant to the top of the shaft especially when the shaft is running at very high speed.

Having thus described our invention, what we claim as new and desire to secure by Letters Patent is as follows:—

1. A lubricating bearing comprising a support, an oil reservoir therein, spaced bridges within said support, a shaft bearing carried by said bridges, an oiling member adapted to rest upon and be actuated by the shaft, said oiling member being guided between said bridges, and an adjustable roller arranged over the shaft and adapted to contact with the upper side of said oiling member.

2. A device of the class described comprising a support having an oil reservoir therein, a shaft having a bearing in said support, an oiling member adapted to rest upon and be actuated by the shaft, said member having a flat periphery and a self adjustable roller adapted to contact with the periphery of said oiling member over the shaft.

3. A device of the class described comprising a shaft, a bearing support therefor, an oil reservoir, an oiling ring adapted to rest upon and be actuated by said shaft said ring having an inner channel and an outer flat surface and a self adjustable roller mounted over the shaft and adapted to contact with the periphery of the ring.

4. A lubricating bearing comprising a support, an oil reservoir therein, spaced bridges within said support, a shaft bearing carried by said bridges, an oiling ring adapted to rest upon and be actuated by the shaft said ring being guided between said bridges and having a channel formed on the inside thereof, and a self adjustable roller arranged over the shaft and adapted to contact with the periphery of said ring.

In testimony whereof we affix our signatures in presence of two witnesses.

GEORGE L. BASCOME.
CHARLES V. KERR.

Witnesses:
ALFRED S. McCLURE,
EDW. RATHBUN.